US010329026B2

(12) United States Patent
Haskins et al.

(10) Patent No.: US 10,329,026 B2
(45) Date of Patent: Jun. 25, 2019

(54) AIRCRAFT FUEL SYSTEM WITH FUEL RETURN FROM ENGINE

(71) Applicant: AIRBUS OPERATIONS LIMITED, Bristol (GB)

(72) Inventors: Richard Haskins, Bristol (GB); Franklin Tichborne, Bristol (GB); Joseph K-W Lam, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 431 days.

(21) Appl. No.: 14/436,516

(22) PCT Filed: Oct. 16, 2013

(86) PCT No.: PCT/GB2013/052700
§ 371 (c)(1),
(2) Date: Apr. 17, 2015

(87) PCT Pub. No.: WO2014/060751
PCT Pub. Date: Apr. 24, 2014

(65) Prior Publication Data
US 2016/0167801 A1 Jun. 16, 2016

(30) Foreign Application Priority Data

Oct. 19, 2012 (GB) .................. 1218815.7

(51) Int. Cl.
*B64D 37/02* (2006.01)
*B64D 37/34* (2006.01)
(Continued)

(52) U.S. Cl.
CPC ............. *B64D 37/02* (2013.01); *B64D 37/32* (2013.01); *B64D 37/34* (2013.01); *F02C 7/222* (2013.01);
(Continued)

(58) Field of Classification Search
CPC ........ B64D 37/30; B64D 37/34; B64D 37/02; F02M 37/0052; F02M 37/10;
(Continued)

(56) References Cited

U.S. PATENT DOCUMENTS 2,660,232 A * 11/1953 Cyril ................... F02M 37/025
 123/495
4,041,697 A * 8/1977 Coffinberry ............... F02C 7/14
 123/41.33
(Continued)

FOREIGN PATENT DOCUMENTS

DE 3735908 A1 5/1989
EP 0537933 A1 4/1993
JP 2007271146 A 10/2007

OTHER PUBLICATIONS

International Search Report dated Feb. 6, 2014 in International Application No. PCT/GB2013/052700, filed Oct. 16, 2013.
(Continued)

*Primary Examiner* — Steven M Sutherland
*Assistant Examiner* — Thuyhang N Nguyen
(74) *Attorney, Agent, or Firm* — Nixon & Vanderhye P.C.

(57) ABSTRACT

An aircraft fuel system, comprising: a fuel tank; a fuel line; and an engine; wherein the fuel line includes a first conduit configured to carry fuel from the tank towards the engine, and a second conduit configured to carry fuel from the engine towards the tank, wherein one of the first conduit or the second conduit is disposed annularly around the other of the first conduit or the second conduit. Also, a method of operating the system. The system may be used to suppress ice formation in the first conduit and/or provide leakage detection.

24 Claims, 4 Drawing Sheets

(51) Int. Cl.
*F02M 31/16* (2006.01)
*F02M 37/00* (2006.01)
*F02M 37/10* (2006.01)
*B64D 37/32* (2006.01)
*F02C 7/22* (2006.01)

(52) U.S. Cl.
CPC ........ *F02M 31/16* (2013.01); *F02M 37/0052* (2013.01); *F02M 37/10* (2013.01); *F05D 2220/323* (2013.01); *F05D 2260/601* (2013.01); *Y02T 10/126* (2013.01)

(58) Field of Classification Search
CPC ........ F05D 2220/323; F02C 7/14; F02C 9/46; F02C 7/22
See application file for complete search history.

(56) References Cited

U.S. PATENT DOCUMENTS

| | | | |
|---|---|---|---|
| 4,433,820 A | 2/1984 | Turiot | |
| 4,784,104 A * | 11/1988 | Dimond | F02D 33/003 123/468 |
| 4,907,761 A | 3/1990 | Derrien et al. | |
| 5,005,551 A | 4/1991 | McNelley | |
| 5,100,083 A | 3/1992 | Large et al. | |
| 5,429,323 A | 7/1995 | Derrien et al. | |
| 5,497,809 A | 3/1996 | Wolf | |
| 6,250,328 B1 * | 6/2001 | Distelhoff | F02M 31/20 123/41.31 |
| 6,651,931 B1 | 11/2003 | Fox et al. | |
| 7,527,481 B2 * | 5/2009 | Baryshnikov | F02C 7/232 417/183 |
| 8,701,467 B2 * | 4/2014 | Carns | F16L 23/003 285/123.1 |
| 8,876,056 B2 * | 11/2014 | Lam | B64D 37/34 244/134 D |
| 2010/0294128 A1 | 11/2010 | Schmidt et al. | |
| 2011/0309193 A1 | 12/2011 | Seror Goguet | |

OTHER PUBLICATIONS

Written Opinion dated Feb. 6, 2014 in International Application No. PCT/GB2013/052700, filed Oct. 16, 2013.

UKIPO Search Report dated Aug. 29, 2012 in Great Britain Application No. GB1209419.9.

* cited by examiner

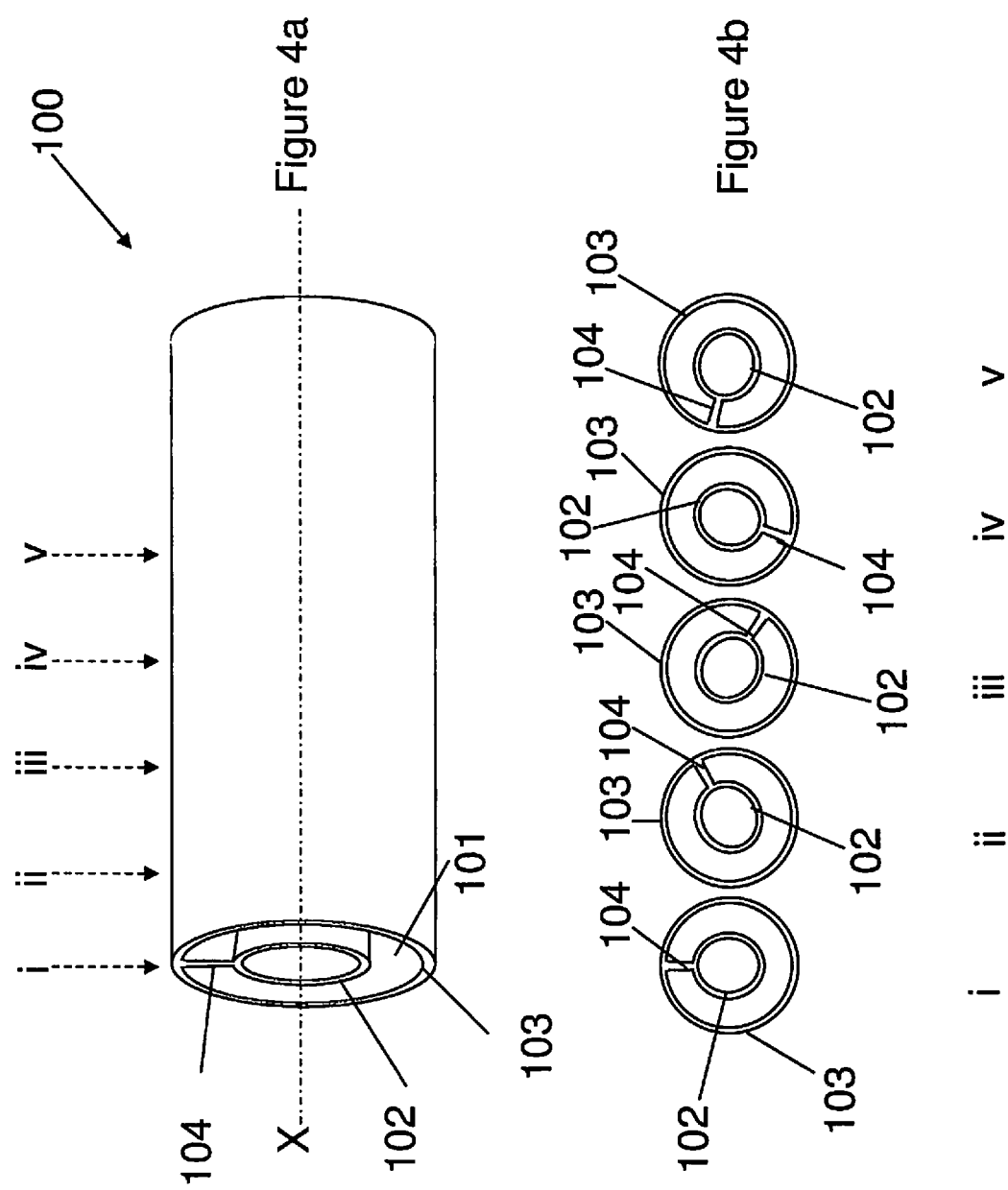

AIRCRAFT FUEL SYSTEM WITH FUEL RETURN FROM ENGINE

RELATED APPLICATIONS

The present application is a National Phase of International Application Number PCT/GB2013/052700, filed Oct. 16, 2013, and claims priority from Great Britain Application Number 1218815.7, filed Oct. 19, 2012.

FIELD OF THE INVENTION

The present invention relates to an aircraft fuel system. In particular the invention relates to the suppression of ice formation in a fuel line.

BACKGROUND OF THE INVENTION

Due to the low ambient temperatures in which some aircraft are expected to operate, aircraft can suffer from ice accretion in fuel lines. Water is an unavoidable contaminant in fuel and if the fuel temperature drops to around 0 degrees Celsius or below then ice formation can occur. If this ice formation is allowed to reach certain components such as engine fuel filters then blockage of the filter can exceptionally occur. In extreme cases this could cause engine failure (Ref: AAIB Special Bulletin S1/2008).

SUMMARY OF THE INVENTION

A first aspect of the invention provides an aircraft fuel system, comprising: a fuel tank; a fuel line; and an engine; wherein the fuel line includes a first conduit configured to carry fuel from the tank towards the engine, and a second conduit configured to carry fuel from the engine towards the tank, wherein one of the first conduit or the second conduit is disposed annularly around the other of the first conduit or the second conduit.

A further aspect of the invention provides a method for transferring fuel in an aircraft fuel system, the method comprising delivering fuel from a fuel tank towards an engine through a first conduit of a fuel line, delivering fuel from the engine towards the fuel tank through a second conduit of the fuel line, wherein one of the first conduit or the second conduit is disposed annularly around the other of the first conduit or the second conduit.

The invention is advantageous in that the fuel in the second conduit will generally be at a higher temperature and pressure than the fuel in the first conduit, since it is coming from the engine. The higher temperature of the fuel in the second conduit may be used to transfer heat energy into the fuel in the first conduit, thereby suppressing ice formation in the first conduit. Additionally, or alternatively, the higher pressure of the fuel in the second conduit may be used as a motive flow for a jet pump disposed within the fuel tank. This makes particularly efficient use of the thermal and pressure energy in the fuel coming from the engine via the second conduit.

The fuel line may be configured to transfer heat from the fuel in the second conduit to the fuel in the first conduit. For example, the fuel line may have an internal wall between the inner and outer conduits that has beneficial thermal properties for heat transfer, e.g. a thin-walled construction and/or material of high thermal conductivity.

The engine may include a high pressure fuel pump for delivering a supply of fuel to a combustor.

The system may further comprise a fuel return for returning excess fuel from the engine to the fuel tank via the second conduit.

The high pressure fuel pump may be configured to output excess fuel to the fuel return.

The engine may further comprise a heat exchanger. The heat exchanger may be configured to transfer excess heat from the engine into the fuel. In particular, the heat exchanger may be configured to transfer heat from an engine oil flow path and/or a generator, for example.

The engine may include a high pressure fuel pump for delivering a supply of fuel to a combustor, a fuel return for returning excess fuel output by the high pressure fuel pump to the fuel tank via the second conduit, and a heat exchanger, wherein the fuel that is returned to the fuel tank is heated by the heat exchanger.

The system may further comprise a fuel pump for delivering a supply of fuel from the tank towards the engine via the first conduit.

The second conduit may be in fluid communication with an outlet in the fuel tank.

The system may further comprise a jet pump disposed within the fuel tank for delivering a supply of fuel from the tank towards the engine via the first conduit. The jet pump may have a motive fluid inlet in fluid communication with the second conduit.

The engine may include a high pressure fuel pump for delivering a supply of fuel to a combustor, and a fuel return for returning excess fuel output by the high pressure fuel pump via the second conduit to the jet pump for providing motive flow to the jet pump.

The system may further comprise a sensor, e.g. a pressure transducer, for detecting a leak in the fuel line.

The system may be installed in an aircraft, wherein the fuel line is disposed within a pylon coupling the engine to a fuselage or wing of the aircraft.

BRIEF DESCRIPTION OF THE DRAWINGS

Embodiments of the invention will now be described with reference to the accompanying drawings, in which:

FIGS. 4a & b illustrate a section of a double-walled duct suitable for use with the invention.

DETAILED DESCRIPTION OF EMBODIMENT(S)

Embodiments of the invention will now be described with reference to a typical fixed wing commercial jet transport aircraft having underwing mounted engines. However, it will be appreciated that this invention has application to a wide variety of aircraft types including, but not limited to: commercial or military aircraft; fixed wing or rotary wing aircraft; jet, turbo-prop or open rotor engines; underwing, overwing, or fuselage mounted engines; kerosene based or bio-fuel powered engines, etc. In short, this invention has broad application to any aircraft fuel system, and in particular has application to those parts of aircraft fuel systems which are most exposed to the low ambient temperatures typically experienced by the aircraft, e.g. during cruise altitude flight and/or polar climates.

Figure 1:
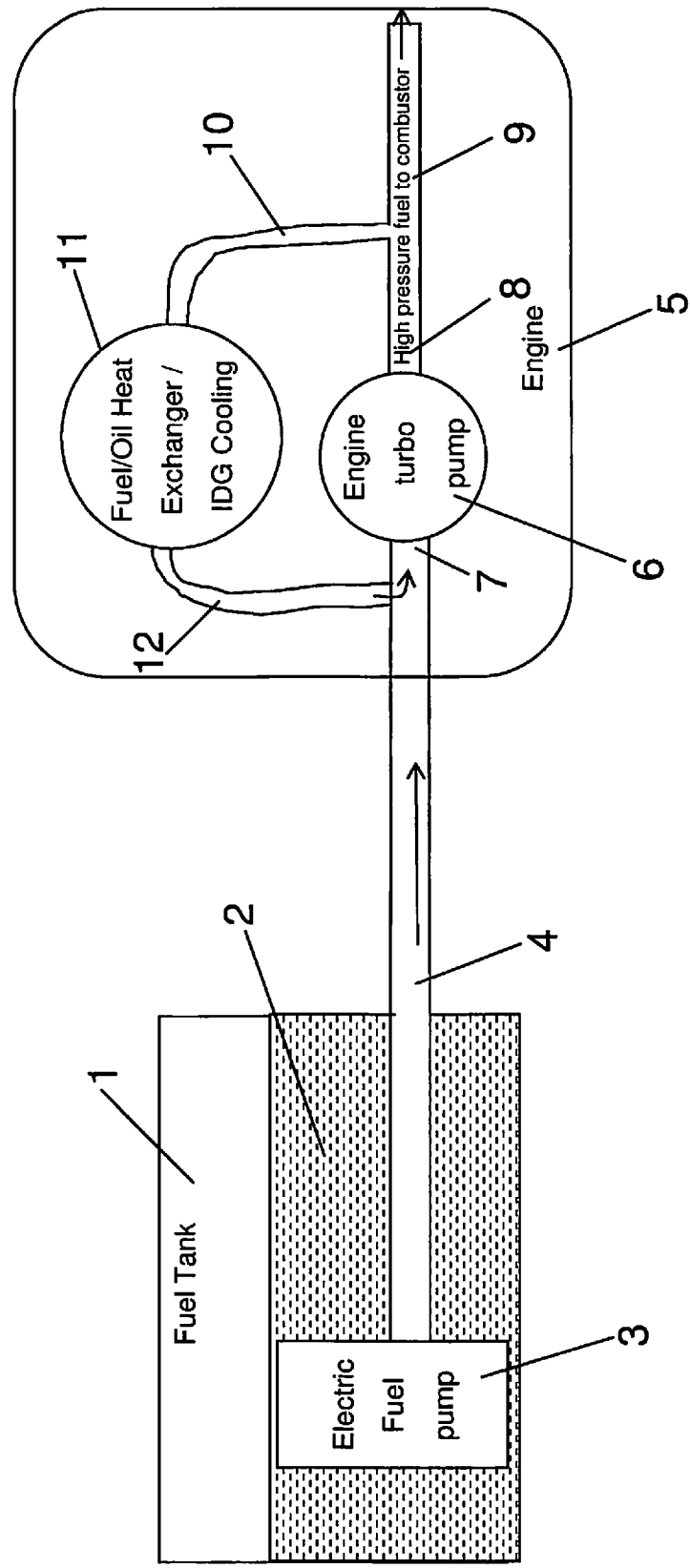
FIG. 1 illustrates schematically a part of a conventional aircraft fuel system.

FIG. 1 illustrates schematically a part of a conventional aircraft fuel system of a fixed wing jet aircraft having underwing mounted engines. As is conventional, the wings are used to define one or more fuel tanks. The fuel tank 1 contains a volume of liquid aviation fuel 2 which is pumped by a low pressure fuel pump 3, in this case an electric fuel pump, through a fuel line 4 to an engine 5. The fuel line 4 passes through a pylon (not shown) used to couple the engine 5 to the aircraft wing. The engine 5 includes a high pressure "turbo" fuel pump 6 which is fluidly coupled to the fuel line 4 at its inlet 7 and outputs fuel under high pressure from outlet 8 towards a combustor (not shown) of the engine 5.

Any excess fuel output by the high pressure pump 6 is bled from the high pressure fuel line 9 via spill flow path 10 to a heat exchanger 11. In this example, the heat exchanger is a fuel/oil heat exchanger (FOHE) and/or an integrated drive generator cooling system (IDG cooling) of conventional type. The heat exchanger 11 may additionally or alternatively be any other type of system for transferring excess heat from the engine 5 into the aviation fuel. The high pressure "hot" fuel exiting the heat exchanger 11 is conveyed by return path 12 to the fuel line 4 on the engine side just upstream of the high pressure fuel pump inlet 7. This fuel is then mixed with the fuel being pumped from the fuel tank 1 and fed to the inlet 7 of the high pressure pump 6.

It will be appreciated that the fuel line 4 supplying fuel 2 from the fuel tank 1 to the engine 5 is, in the case of an aircraft with underwing mounted engines, a part of the aircraft fuel system which has significant exposure to ambient air temperatures external to the aircraft. During the cruise phase of a flight the ambient temperature can drop to below minus 40 degrees Celsius. At these exceptionally low temperatures the water content within the fuel 2 can readily turn to ice unless measures are taken to limit the cooling effects of the ambient temperature upon the fuel temperature.

Ice accumulation within the fuel line 4 can be problematic if this ice is allowed to accumulate upon certain fuel system components such as the fuel pumps, where the ice can cause excessive wear, or fuel fillers, such as those typically found just upstream of the high pressure fuel pump 6, where the ice could clog the filter so starving the engine of fuel necessary for combustion.

It should be noted that FIG. 1 illustrates a highly schematic representation of only a part of the aircraft fuel system and components such as isolation valves, pipe connectors, start up fuel pumps, non return valves, etc. are not shown so as not to obscure the clarity of the invention which will be described below with reference to FIGS. 2 and 3.

Figure 2:
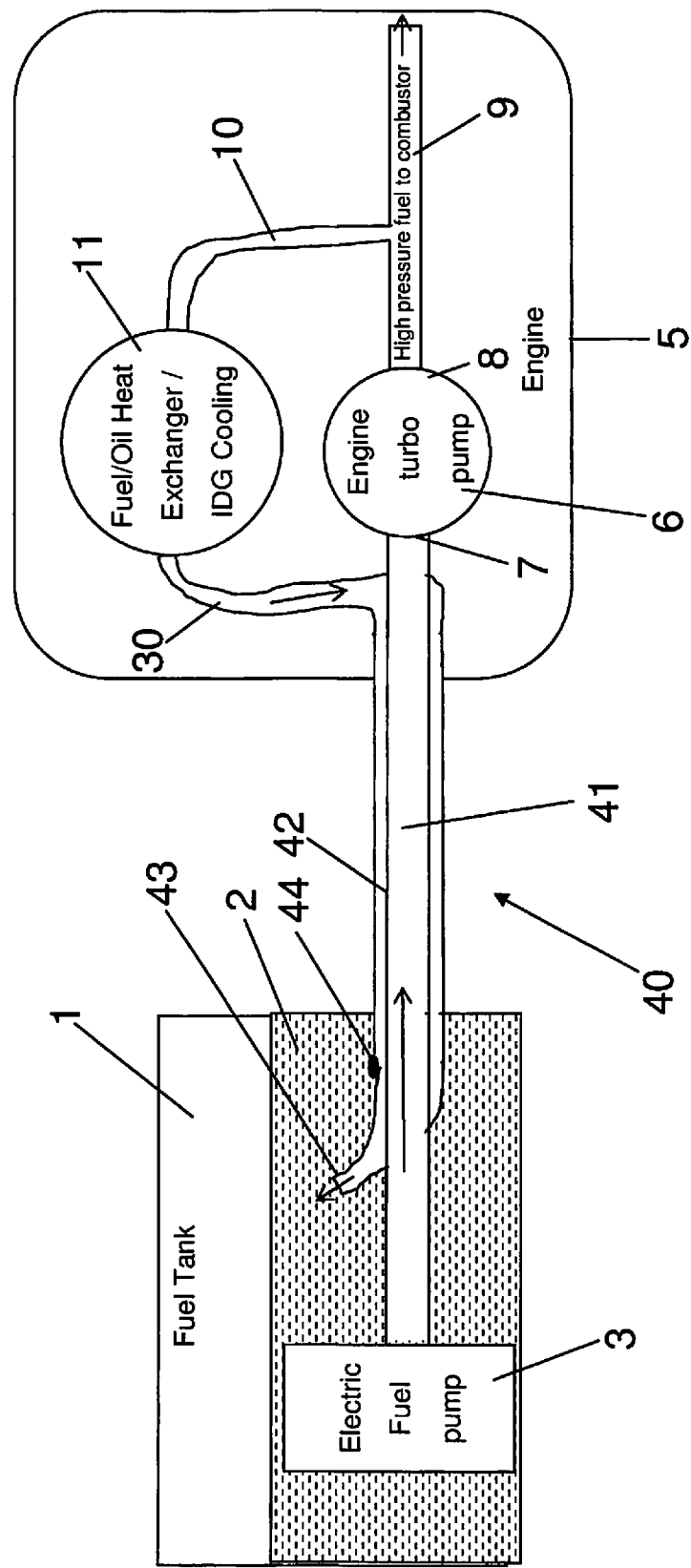
FIG. 2 illustrates schematically a part of an aircraft fuel system in accordance with a first embodiment of this invention.

Turning now to FIG. 2 is shown a schematic representation of a first embodiment of the invention in which like reference numerals have been used to denote like parts of the fuel system shown in FIG. 1. Modified or new components of the aircraft fuel system shown in FIG. 2 will now be described in detail.

Whilst in FIG. 1 the fuel line 4 includes a conduit configured to carry fuel from the fuel tank 1 towards the engine 5, in FIG. 2 the fuel system includes a fuel line 40 comprising a first conduit 41 configured to carry fuel from the fuel tank 1 towards the engine 5 and a second conduit 42 configured to carry fuel from the engine 5 towards the fuel tank 1. The second conduit 42 is disposed annularly around the first conduit 41. The second conduit 42 is fluidly coupled to the outlet of the heat exchanger 11 via a fuel return path 30 within the engine 5. On the fuel tank side, the second conduit 42 has an outlet 43 disposed within the fuel tank 1.

In operation the "hot" high pressure fuel exiting the heat exchanger 11 is returned via the second conduit 42 and exits into the fuel tank 1 via outlet 43. In this way, the fuel line 40 not only carries "cold", low pressure fuel in the first conduit 41 towards the engine 5 in a first flow direction but also carries "hot" high pressure fuel in the second conduit 42 in a second flow direction opposite the first. Since the returning "hot" high pressure fuel in the second conduit 42 has a higher temperature than the fuel in the first conduit 41, a transfer of heat from the fuel in the second conduit 42 to the fuel in the first conduit 41 occurs. To facilitate this heat transfer between the second conduit 42 and the first conduit 41 within the fuel line 40 the fuel line has a relatively thin walled construction and good thermal transfer properties.

This transfer of heat energy from the fuel in the second conduit 42 into the fuel in the first conduit 41 helps to insulate the first conduit 41 from the cooling effects of the ambient air temperature external to the aircraft. This suppresses ice formation within the fuel in the first conduit 41. Furthermore, the elevated temperature of the fuel exiting outlet 43 into the fuel tank 1 helps to raise the bulk temperature of the fuel 2 in the fuel tank 1, thereby further helping to suppress ice formation within the fuel system.

The fuel line 40 may be a double-walled pipe formed of metallic, plastic or composite materials. The first and second conduits are sealed with respect to one another and with respect to the environment. As a leak prevention measure a third conduit may be disposed annularly around the second conduit so as to provide a containment and/or leak detection space. Such a multi-walled duct can take a variety of forms but a particularly suitable multi-walled duct is described in the applicant's co-pending patent application of even date under reference 07961 and entitled "Double-Walled Duct and Extruder Therefore". A section 100 of the duct is shown in FIGS. 4a & b.

As shown in FIGS. 4a & b the duct comprises an inner conduit 102 and an outer conduit 103 disposed annularly around the inner conduit. The inner and outer conduits are coaxially arranged about a common longitudinal axis X. The inner and outer conduits are each substantially circular in cross section. An annular space 101 is defined between the inner and outer conduits. A support structure 104 connects and extends between the inner and outer conduits. The support structure 104 extends in a helical manner along the duct about the longitudinal axis X. The support structure extends substantially radially outwardly between the inner conduit and the outer conduit.

The support structure is formed as a wall having a thickness substantially the same as the wall thickness of the inner and outer conduits. The support structure is therefore relatively thin and occupies an area of approximately only 5% of the cross sectional area of the duct. The helical support structure revolves through over 360 degrees along the length of the duct. The support structure is arranged to support the inner and outer conduits over the complete circumference of the duct. Due to the relatively thin walled construction of the support structure there are substantially no longitudinal blockages or restrictions along the length of the duct.

The inner and outer conduits 102, 103 and the support structure 104 are integrally formed by extrusion from a common material, preferably plastic or composite materials. The helically extruded double walled pipe/duct described above provides a flexible and perfect coaxial double-walled pipe in a continuously extruded form without any longitudinal restrictions, hence a minimum number of joints is required to accomplish the end to end connection between the engine and the fuel tank through the pylon.

In the embodiment shown in FIG. 2 the second (outer) conduit 42 is used to convey the relatively high pressure fuel flow whilst the first (inner) conduit 41 is used to convey the relatively low pressure fuel flow. It will be appreciated that the function of the inner and outer conduits could be reversed such that the first conduit 41 carrying the fuel from the fuel tank towards the engine is disposed annularly around the second conduit carrying fuel from the engine towards the fuel tank.

One advantage of the arrangement shown in FIG. 2 is that by providing the high pressure fuel flow in the outer conduit, the fluid pressure in the outer conduit can be monitored by a pressure transducer 44 disposed on the fuel tank side of the fuel line 40. If the pressure in the second conduit 42 falls significantly, as detected by the pressure transducer 44, an alert indicative of a fuel leak between the fuel tank 1 and the engine 5 can be displayed in the cockpit of the aircraft, which can be monitored by the pilot to make a decision whether or not to shut down that engine.

A second embodiment of the invention will now be described with reference to FIG. 3 in which, once again, like reference numerals have been used to denote like components with FIG. 2. Modified or new components of the aircraft fuel system shown in FIG. 3 will now be described in detail.

Figure 3:
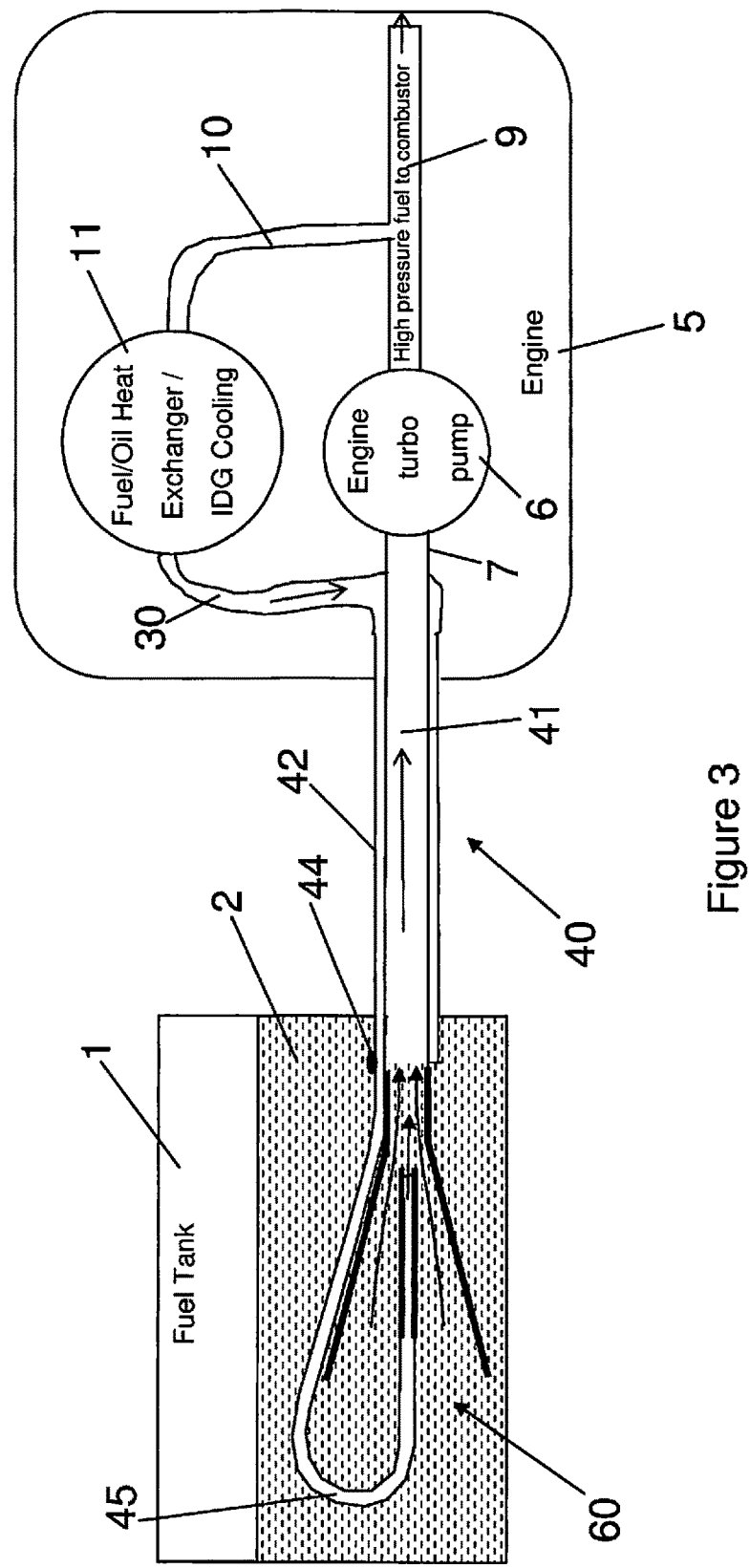
FIG. 3 illustrates schematically a part of an aircraft fuel system in accordance with a second embodiment of this invention.

Whilst in FIG. 2 the high pressure fuel in the second conduit 42 exits via outlet 43 directly into the fuel tank 1, in FIG. 3 advantage is taken of the high pressure of the fuel in the second conduit 42 which is used to provide a motive flow for a jet pump 60 within the fuel tank 1.

As shown in FIG. 3 the second conduit 42 of the fuel line 40 is coupled to a substantially U-shaped pipe 45 so as to reverse the direction of the high pressure fuel flow. The substantially U-shaped pipe 45 carrying the motive fluid for the jet pump 60 has an opening within a convergent duct such that the pressure energy of the motive flow is converted into kinetic energy in the jet pump 60 which draws in the fuel 2 contained within the fuel tank 1, which passes into a first conduit 41 and is conveyed from the fuel tank 1 to the engine 5.

The jet pump 60 has an advantage over the electric fuel pump 3 of the first embodiment shown in FIG. 2 in that the jet pump has no moving parts, which improves reliability and reduces maintenance requirements. For the jet pump 60 to function the motive flow provided by the high pressure fuel returned from the engine via the second conduit 42 requires a pressure of the order of around 300 psi or more. However, it will be appreciated that the jet pump 60 relies upon operation of the high pressure fuel pump 6 in the engine, which in turn relies upon a supply of fuel from the fuel tank 1 and so a small starter fuel pump may be required in the fuel tank 1 to initiate the process, in particular for the instance where the fuel line 40 between the fuel tank 1 and the engine 5 has been vacated of fuel for any reason. The starter fuel pump is not shown in FIG. 3.

In the second embodiment shown in FIG. 3 the fuel line 40 may be a duct such as shown in FIGS. 4a & b, or may be another other suitable duct such as those described with reference to the first embodiment.

Although the invention has been described above with reference to one or more preferred embodiments, it will be appreciated that various changes or modifications may be made without departing from the scope of the invention as defined in the appended claims.

The invention claimed is:

1. An aircraft fuel system, comprising:
    a fuel tank,
    a fuel line,
    an engine,
        wherein the fuel line includes a first conduit configured to carry fuel from the tank towards the engine, and a second conduit open at the engine and configured to carry fuel from the engine towards the fuel tank,
        wherein the engine includes a high pressure fuel pump for delivering a supply of fuel to a combustor,
        wherein the first conduit and the second conduit are arranged coaxially about a common longitudinal axis, and the first conduit is upstream of the high pressure fuel pump and inside the second conduit, the common longitudinal axis extends through an interior of each of the first conduit and the second conduit, and
    wherein an outer surface of the first conduit is in contact with the return fuel flowing in the second conduit from the engine toward the fuel tank.

2. The aircraft fuel system according to claim 1, wherein the fuel in the second conduit has a higher temperature than the fuel in the first conduit.

3. The aircraft fuel system according to claim 2, wherein the fuel line is configured to transfer heat from the fuel in the second conduit to the fuel in the first conduit.

4. The aircraft fuel system according to claim 1, further comprising a fuel return for returning excess fuel from the engine to the fuel tank via the second conduit.

5. The aircraft fuel system according to claim 1, and further comprising a fuel return for returning excess fuel from the engine to the fuel tank via the second conduit, wherein the high pressure fuel pump is configured to output excess fuel to the fuel return.

6. The aircraft fuel system according to claim 1, wherein the engine further comprises a heat exchanger.

7. The aircraft fuel system according to claim 6, wherein the heat exchanger is configured to transfer excess heat from the engine into the fuel.

8. The aircraft fuel system according to claim 7, wherein the heat exchanger is configured to transfer heat from an engine oil flow path and/or a generator.

9. The aircraft fuel system according to claim 1, wherein the engine includes a high pressure fuel pump for delivering a supply of fuel to a combustor, a fuel return for returning excess fuel output by the high pressure fuel pump to the fuel tank via the second conduit, and a heat exchanger, wherein the fuel that is returned to the fuel tank is heated by the heat exchanger.

10. The aircraft fuel system according to claim 1, further comprising a fuel pump for delivering a supply of fuel from the tank towards the engine via the first conduit.

11. The aircraft fuel system according to claim 1, wherein the second conduit is in fluid communication with an outlet in the fuel tank.

12. The aircraft fuel system according to claim 1, further comprising a jet pump disposed within the fuel tank for delivering a supply of fuel from the tank towards the engine via the first conduit.

13. The aircraft fuel system according to claim 12, wherein the jet pump has a motive fluid inlet in fluid communication with the second conduit.

14. The aircraft fuel system according to claim 13, wherein the engine includes a high pressure fuel pump for delivering a supply of fuel to a combustor, a fuel return for returning excess fuel output by the high pressure fuel pump via the second conduit to the jet pump for providing motive flow to the jet pump.

15. The aircraft fuel system according to claim 1, further comprising a sensor for detecting a leak in the fuel line.

16. The aircraft fuel system according to claim 15, wherein the sensor is a pressure sensor.

17. An aircraft comprising the aircraft fuel system according to claim 1, wherein the fuel line is disposed within a pylon coupling the engine to a fuselage or wing of the aircraft.

18. The aircraft fuel system according to claim 1, wherein the fuel in the second conduit is at a higher pressure than the fuel in the first conduit.

19. A method for transferring fuel in an aircraft fuel system, the method comprising:
    delivering fuel from a fuel tank towards an engine through a first conduit of a fuel line,
    delivering fuel from the engine towards the fuel tank through a second conduit of the fuel line,
        wherein the second conduit is open at the engine,
        wherein the engine includes a high pressure fuel pump for delivering a supply of fuel to a combustor,
        wherein the first conduit and the second conduit are arranged coaxially about a common longitudinal axis, and the first conduit is upstream of the high pressure fuel pump and inside the second conduit, and wherein an outer surface of the first conduit is in contact with the return fuel flowing in the second conduit from the engine toward the fuel tank.

20. The method according to claim 19, wherein the fuel in the second conduit has a higher temperature than the fuel in the first conduit, and the fuel line is configured to transfer heat from the fuel in the second conduit to the fuel in the first conduit.

21. The method according to claim 19, wherein the fuel in the second conduit flows into the fuel tank via an outlet in the fuel tank.

22. The method according to claim 19, wherein the fuel in the second conduit provides motive flow for a jet pump arranged to supply fuel from the fuel tank into the first conduit.

23. The method according to claim 19, wherein the fuel line is disposed within a pylon coupling the engine to a fuselage or wing of the aircraft.

24. The method according to claim 19, wherein the fuel in the second conduit is at a higher pressure than the fuel in the first conduit.

* * * * *